US012686605B2

(12) United States Patent
Rider et al.

(10) Patent No.: US 12,686,605 B2
(45) Date of Patent: Jul. 21, 2026

(54) METHOD AND APPARATUS FOR BEVERAGE TRANSFER FROM SOURCE TO DESTINATION CONTAINER

(71) Applicant: Coravin, Inc., Bedford, MA (US)

(72) Inventors: Michael Rider, Lowell, MA (US); Lauren Michelle Inch, Liverpool, NY (US); Otto DeRuntz, Dunstable, MA (US)

(73) Assignee: Coravin, Inc., Bedford, MA (US)

( * ) Notice: Subject to any disclaimer, the term of this patent is extended or adjusted under 35 U.S.C. 154(b) by 865 days.

(21) Appl. No.: 17/959,747

(22) Filed: Oct. 4, 2022

(65) Prior Publication Data

US 2023/0116777 A1 Apr. 13, 2023

Related U.S. Application Data

(60) Provisional application No. 63/337,365, filed on May 2, 2022, provisional application No. 63/253,848, filed on Oct. 8, 2021.

(51) Int. Cl.
*B67D 1/00* (2006.01)

(52) U.S. Cl.
CPC .................................. *B67D 1/0003* (2013.01)

(58) Field of Classification Search
CPC .. B67D 1/0003; B67D 1/0406; B67D 1/0082; B67D 1/0009; B67D 1/0412;
(Continued)

(56) References Cited

U.S. PATENT DOCUMENTS 3,698,870 A * 10/1972 de Jong ................. G01N 35/08 422/82
4,296,785 A * 10/1981 Vitello ..................... G21G 4/08 141/105
(Continued)

FOREIGN PATENT DOCUMENTS

WO WO 2009/024722 A2 2/2009
WO WO 2017/087487 A2 5/2017
WO WO 2022/069886 A1 4/2022

OTHER PUBLICATIONS

Invitation to Pay Additional Fees and Communication Relating to the Results of the Partial International Search for International Application No. PCT/US2022/046002, mailed Feb. 3, 2023.
(Continued)

*Primary Examiner* — Sameh Tawfik
(74) *Attorney, Agent, or Firm* — Wolf, Greenfield & Sacks, P.C.

(57) ABSTRACT

A system and method for transferring beverage such as wine from a source container to a destination container. First and second transfer heads can be configured to sealingly engage with an opening of source and destination containers, respectively. The container opening(s) can have a closure such as a cork or septum and the transfer heads can sealingly engage with the container opening without removing the closure, e.g., by passing one or more needles through the closure. The transfer heads and the source container can be held by a support, and the first transfer head can be mounted for pivotal movement relative to the support, e.g., about a horizontal axis, to accommodate differently sized and/or shaped containers. Pressurized gas, e.g., used to purge and/or pressurize the containers, and beverage flow can be routed from one of the transfer heads to the other.

11 Claims, 3 Drawing Sheets

(58) Field of Classification Search
CPC .. B67D 1/0456; B67D 1/0885; B67D 1/0801; B67D 1/0418; B67D 1/08; B67D 3/20; B65D 83/32; B65D 83/00; B65B 31/04
USPC ........................................................... 53/403
See application file for complete search history.

(56) References Cited

U.S. PATENT DOCUMENTS

| | | | | | |
|---|---|---|---|---|---|
| 4,582,480 | A * | 4/1986 | Lynch | C23C 16/4482 | 392/394 |
| 4,859,375 | A * | 8/1989 | Lipisko | C30B 25/14 | 141/83 |
| 5,215,129 | A * | 6/1993 | Berresford | B67D 1/04 | 141/66 |
| 5,413,671 | A * | 5/1995 | Ketchum | C23C 16/4405 | 216/37 |
| 5,607,000 | A * | 3/1997 | Cripe | B67D 7/0277 | 141/2 |
| 5,823,234 | A * | 10/1998 | Boertz | B67C 3/202 | 141/1 |
| 5,871,028 | A * | 2/1999 | Liu | G03F 7/16 | 137/392 |
| 6,296,025 | B1 * | 10/2001 | Gregg | B67D 7/0277 | 141/49 |
| 6,557,459 | B1 | 5/2003 | Phelps et al. | | |
| 6,913,167 | B2 | 7/2005 | Phelps et al. | | |
| 7,258,252 | B2 | 8/2007 | Waters | | |
| 7,533,701 | B2 * | 5/2009 | Gadzic | B67D 1/0009 | 141/54 |
| 7,712,631 | B2 | 5/2010 | Taradalsky et al. | | |
| 8,033,431 | B2 * | 10/2011 | Sommerfield | B67D 1/1455 | 222/394 |
| 8,505,833 | B2 | 8/2013 | Fehr et al. | | |
| 8,899,283 | B2 | 12/2014 | De Crasto | | |
| 9,708,575 | B2 | 7/2017 | Koretz et al. | | |
| 10,759,553 | B2 | 9/2020 | Henry et al. | | |
| 2006/0283523 | A1 | 12/2006 | Gadzic et al. | | |
| 2010/0155419 | A1 | 6/2010 | Nishino | | |
| 2013/0306673 | A1 * | 11/2013 | Manera | B65D 83/32 | 222/399 |
| 2019/0352163 | A1 * | 11/2019 | Lambrecht | B67D 1/0456 | |

OTHER PUBLICATIONS

International Search Report and Written Opinion for International Application No. PCT/US2022/046002, mailed Mar. 28, 2023.

* cited by examiner

METHOD AND APPARATUS FOR BEVERAGE TRANSFER FROM SOURCE TO DESTINATION CONTAINER

RELATED APPLICATIONS

This Application claims priority under 35 U.S.C. § 119(e) to U.S. Provisional Application Nos. 63/253,848, filed Oct. 8, 2021, and 63/337,365, filed May 2, 2022, each of which is herein incorporated by reference in its entirety.

BACKGROUND OF INVENTION

This invention relates generally to the transfer of fluids from a source beverage container to a destination container, e.g., without exposing the beverage to air or other environmental conditions.

SUMMARY OF INVENTION

One or more embodiments in accordance with aspects of the invention allow a user to transfer or otherwise extract a beverage, such as wine, from within a bottle that is sealed by a cork, plug, elastomeric septum or other closure without removing the closure. In some cases, removal of beverage from such a bottle may be performed one or more times, yet the closure may remain in place during and after each beverage extraction to maintain a seal for the bottle. Thus, the beverage may be transferred from the bottle multiple times and stored for extended periods between each transfer with little or no effect on beverage quality. Also, the beverage can be transferred into a destination container such that the beverage is not exposed to air or other environmental conditions. Thus, in some embodiments, little or no gas, such as air, which is reactive with the beverage, may be introduced into either the source or destination container either during or after transfer of beverage from the source to the destination container. Thus, in some embodiments, a user may withdraw wine from a wine bottle without removal of, or damage to, the cork, and without allowing air or other potentially damaging gasses or liquids entry into the bottle, and the wine can be transferred to another container which receives and holds the wine without exposing the wine to air or other potentially damaging gasses or liquids.

In some embodiments, a system for transferring beverage from a source container to a destination container includes a first transfer head configured to sealingly engage with an opening of the source container to deliver gas into an interior space of the source container and to receive beverage from the source container. A second transfer head may be configured to sealingly engage with the destination container to deliver the beverage from the source container into an interior space of the destination container, and a support can be configured to support the first and second transfer heads and to support the source container with the opening of the source container positioned below a bottom of the source container. In some cases, the first transfer head can be mounted to pivot relative to the support, e.g., about a horizontal axis and/or so that the source container can be engaged with the first transfer head and remain movable relative to the support. In some cases, the second transfer head can be fixed to the support and the first transfer head can be pivotally mounted to the second transfer head and thus pivotally mounted to the support.

In some embodiments, the first transfer head can include at least one needle configured to penetrate through a closure such as a cork in the opening of the source container to deliver gas into the interior space of the source container and to receive beverage from the source container. Similarly, the second transfer head can include at least one needle configured to penetrate through a closure in the opening of the destination container to deliver gas into the interior space of the destination container to purge the destination container and to deliver beverage from the source container to the destination container.

In some cases, a first gas pathway can be fluidly coupled to the first transfer head and include a pressurize valve configured to deliver pressurized gas into the source container to pressurize the interior space of the source container. A second gas pathway can be fluidly coupled to the second transfer head and include a sparge valve configured to deliver pressurized gas into the destination container. A beverage pathway can be fluidly coupled between the first and second transfer heads and include a beverage valve configured to control delivery of the beverage from the source container to the destination container via the beverage pathway. The pressurize, sparge and beverage valves can be operated to purge the destination container of air and transfer beverage from the source to the destination container.

In some embodiments, a destination container support can be configured to move the destination container relative to the second transfer head and sealingly engage the destination container with the second transfer head. Thus, for example, engagement and/or disengagement of the second transfer head with the destination container can be automated, e.g., based on movement of the destination container support.

In some cases, a beverage pathway fluidly can be coupled between the first and second transfer heads and configured to deliver beverage from the source container to the destination container. Beverage flow along the beverage pathway can be driven only by gravity and pressure in the interior space of the source container. In some embodiments, a beverage valve can be configured to control delivery of the beverage from the source container to the destination container via the beverage pathway.

In some embodiments, a system for transferring beverage from a source container to a destination container includes a first transfer head with a gas inlet configured to receive pressurized gas, first and second gas outlets to deliver gas received at the gas inlet, and a first beverage pathway configured to transfer beverage with a first container. The first transfer head can be configured to engage with the first container to fluidly couple the first gas outlet and the first beverage pathway with an interior space of the first container, e.g., to deliver beverage from the first container. A second transfer head can include a gas inlet, a gas outlet, and a second beverage pathway configured to transfer beverage with a second container. The second transfer head can be configured to engage with the second container to fluidly couple the gas outlet and the second beverage pathway with an interior space of the second container. A gas line can connect the second gas outlet of the first transfer head to the gas inlet of the second transfer head, and a beverage line can connect the first and second beverage pathways to transfer beverage between the first transfer head and the second transfer head. In some cases, the first gas outlet and the first beverage pathway can be connected to at least one needle configured to deliver gas into the first container and transfer beverage with the first container. The at least one needle can include a first needle connected to the first gas outlet and a second needle connected to the first beverage pathway with the first and second needles configured to penetrate through a closure of the first container to position distal ends of the first and second needles in an interior space of the first container. In some cases, the first container can be the destination container and the second container can be the source container, and the beverage line can be connected to the second beverage pathway to deliver beverage from the source container to the destination container via the first beverage pathway.

In some cases, the gas outlet of the second transfer head and the second beverage pathway can be connected to at least one needle configured to deliver gas into the second container and transfer beverage with the second container. The at least one needle can include a first needle connected to the gas outlet of the second transfer head and a second needle connected to the second beverage pathway with the first and second needles configured to penetrate through a closure of the second container to position distal ends of the first and second needles in an interior space of the second container.

In some embodiments, wherein the first and second transfer heads can be connected to each other and configured to engage with the first and second container, respectively, with one of the first and second containers positioned above the other of the first and second containers. For example, the first and second transfer heads can be pivotally connected together.

In some cases, the system can include a first gas valve configured to control gas flow from the gas inlet of the first transfer head to the first gas outlet to introduce gas into the first container, a second gas valve configured to control gas flow from the gas inlet of the first transfer head to the second gas outlet to introduce gas into the second container via the gas outlet of the second transfer head, and/or a beverage valve configured to control flow of beverage through the beverage line. In some cases, the first container is a destination container, the second container is a source container, and the first gas valve can be configured to open to deliver gas from the gas inlet to the destination container to replace air in the destination container with gas from the gas inlet. The second gas valve can be configured to open to deliver gas from the gas inlet to the source container to pressurize the source container and cause beverage flow from the source container to the destination container via the first beverage pathway, the beverage line and the second beverage pathway. The beverage valve can be configured to open to permit beverage flow from the source container to the destination container and to close to stop beverage flow from the source container to the destination container.

In some cases, a container support can be configured to support and move the first or second container into engagement with the first or second transfer head. For example, the container support can be configured to support and move the first container into engagement with the first transfer head, where the first container has a closure and the first transfer head includes at least one needle fluidly coupled to the first gas outlet and the first beverage pathway. The container support can be configured to move the first container such that the at least one needle penetrates through the closure. In some cases, the at least one needle can be configured to vent an interior space of the first container when pressurized gas is delivered into the first container via the first gas outlet.

In some embodiments, the first transfer head can be configured to sealingly couple the first gas outlet and the first beverage pathway with the interior space of the first container suitable to prevent ambient atmosphere from entering the interior space of the first container, and/or the second transfer head can be configured to sealingly couple the gas outlet of the second transfer head and the second beverage pathway with the interior space of the second container suitable to prevent ambient atmosphere from entering the interior space of the second container.

In some embodiments, a method for transferring beverage from a source container to a destination container includes delivering pressurized gas into an interior space of the destination container while venting the interior space so as to replace air in the interior space with the pressurized gas, fluidly coupling an interior space of the source container to an interior space of the destination container using a beverage pathway, and delivering pressurized gas into the interior space of the source container while preventing fluid from leaving the interior space so as to pressurize the interior space of the source container. Delivery of pressurized gas into the interior space of the source container can be stopped, and beverage permitted to flow from the source container to the destination container via the beverage pathway after stopping delivery of pressurized gas into the interior space of the source container. Flow of the beverage via the beverage pathway can be driven by pressure in the interior space of the source container.

In some cases, delivering pressurized gas into the interior space of the destination container can include operating a purge valve to deliver the pressurized gas to the interior space of the destination container via a gas conduit that is sealingly engaged with the destination container. In some embodiments, delivering pressurized gas into the interior space of the destination container can include inserting a needle through a closure of the destination container, where the pressurized gas is delivered into the interior space of the destination container via the needle. In some cases, fluidly coupling the interior space of the source and destination containers can include inserting at least one first needle through a closure of the destination container and at least one second needle through a closure of the source container with the at least one first and second needles being fluidly coupled together to define the beverage pathway. The at least one first needle can include a first needle that defines part of the beverage pathway, and pressurized gas can be delivered into the interior space of the destination container via the first needle.

In some embodiments, a pressurize valve can be operated to deliver pressurized gas to the interior space of the source container via a gas conduit that is sealingly engaged with the source container. Beverage can be permitted to flow by opening a beverage valve to permit beverage to flow through the beverage pathway under pressure of the interior space of the source container. In some cases, gas can be vented from the destination container via a vent conduit that is sealingly engaged with the destination container. Pressurized gas can be delivered into the interior space of the destination container by in part venting gas from the destination container via a vent conduit that is sealingly engaged with the destination container.

In some embodiments, a beverage container to hold a liquid beverage includes a container body having an interior space to hold the liquid beverage and an opening through which to access the interior space. A cap can be engaged with the container body to seal the opening closed to prevent gas or liquid from passing through the opening, and the cap can include a portion configured to be pierced by a needle to dispense the liquid beverage into the container body and to reseal upon withdrawal of the needle to prevent gas or liquid from passing through the cap. A tamper evident seal can be included with the cap that indicates the cap has not been removed from the container body, e.g., a shrink wrap seal over the cap and/or a breakaway ring or label. The interior space of the container body can contain only gas and no liquid, e.g., the tamper evident seal can indicate that the container contains only inert gas and no liquid and that the container has not been opened to permit air to enter the container.

In some cases, the portion of the container configured to be pierced includes an elastomeric septum configured to be pierced by a needle and to reseal upon withdrawal of the needle, and the elastomeric septum can include a pierced opening that is resealed to prevent gas or liquid from passing through the cap. The pierced opening can be formed by purging the container of air after the cap and tamper evident seal are engaged with the container body. For example, the interior space can contain argon or CO2 gas and include less than 0.5% oxygen gas. In some embodiments, the portion configured to be pierced can include a pierced opening that is resealed to prevent gas or liquid from passing through the cap. In some embodiments, a pressure at the interior space is within 20% of atmospheric pressure, e.g., a pressure above atmospheric pressure.

In some cases, the cap can include a cap body having a passageway from an upper opening to a lower opening of the cap, and a barrier label over the upper opening to resist oxygen entry through the upper opening.

In some embodiments, a beverage container to hold a liquid beverage includes a container body having an interior space to hold the liquid beverage and an opening through which to access the interior space. A cap can be engaged with the container body to seal the opening closed to prevent gas or liquid from passing through the opening with the cap including a portion configured to be pierced by a needle to dispense the liquid beverage into the container body and to reseal upon withdrawal of the needle to prevent gas or liquid from passing through the cap. The interior space can contain only gas and no liquid, and the portion configured to be pierced can include a pierced opening that is resealed to prevent gas or liquid from passing through the cap.

In some embodiments, a method for preparing a beverage container for receipt of a beverage includes providing the beverage container empty of liquid and containing only gas, placing a cap on the beverage container while it is empty of liquid to seal container closed, introducing a non-reactive gas into the beverage container through cap to displace the gas in the beverage container, and sealing the cap to contain the non-reactive inside beverage container with the beverage container empty of liquid. This can prepare the container to receive a beverage sample with minimized risk of exposing the beverage to air.

In some cases, a portion of the cap can be pierced with a needle to introduce the non-reactive gas into the beverage container via the needle. Upon withdrawal of the needle, the portion of the cap can reseal to prevent gas or liquid from passing through the cap. In some cases, an interior space of the beverage container can contain less than 0.5% oxygen gas after the non-reactive gas is introduced into the container. A pressure in the container can be within 20% of atmospheric pressure and can be above atmospheric pressure.

In some embodiments, a barrier label can be provided over an upper opening of the cap to resist oxygen entry through the upper opening, and/or a tamper evident seal can be provided on the cap to indicate the cap has not been removed from the container body. The barrier label and/or tamper evident seal can be provided before the non-reactive gas is introduced into the container.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various embodiments may be used alone and/or in any suitable combination with each other, and thus various embodiments should not be interpreted as requiring any particular combination or combinations of features. Instead, one or more features of the embodiments described may be combined with any other suitable features of other embodiments.

In some embodiments, beverage such as wine can be transferred from one container to another without exposing the beverage to air or other environmental conditions. Thus, for example, a sample of wine can be transferred from a source bottle or other container to another container (e.g., a smaller sample bottle) for later tasting or other analysis. This can provide various advantages, such as allowing a vendor to store wine in larger containers such as barrels or large bottles and transfer a smaller portion of the stored volume to a smaller container, e.g., at a time of retail sale or assessment by a wholesale purchaser. Since the beverage can be transferred to a sample container without exposure to air or other environmental conditions, the beverage need not be analyzed at the location where it is stored in the larger containers. Instead, the beverage can be taken in a smaller sample container to another remote location for consumption and/or analysis with the assurance that the beverage will be in the same condition as when it was transferred to the sample container.

Figure 1:
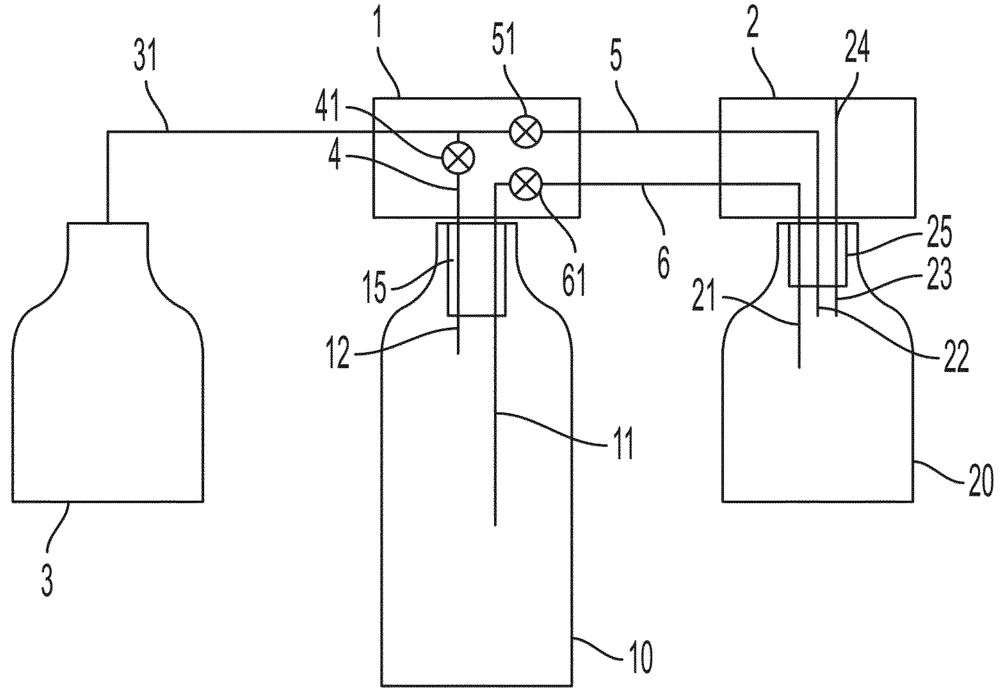
FIG. 1 shows a schematic view of a beverage transfer system in an illustrative embodiment.

FIG. 1 shows a schematic view of a system for transferring beverage from a source container 10 to a destination container 20. In some embodiments, the source container 10 can be a wine bottle, e.g., a glass bottle having an opening that is sealed closed by a closure 15 such as a cork, plug, cap, stopper, etc. that is fitted in the opening or otherwise engaged with the bottle to seal the opening closed, such as by threadedly engaging with the container neck. However, embodiments are not limited to use with a wine bottle and can be employed with any suitable container for any suitable beverage, such as barrels, casks, etc. The destination container 20 can be configured in any suitable way, e.g., similarly to the source container 10 and having a closure 25 such as a cork, plug, cap, stopper, etc. fitted in the opening of the container 20 or otherwise arranged to seal the opening closed. First and second transfer heads 1, 2 are configured to sealingly engage with the source and destination containers 10, 20 (also referred to as first and second containers 10, 20), e.g., so that air, water vapor or other environmental conditions cannot enter into the container 10, 20 when the transfer heads 1, 2 are engaged with the container 10, 20. This type of engagement can help ensure that beverage is transferred from one container 10 to the other container 20 without exposing the beverage to the environmental conditions, which could affect the flavor, appearance, sterility or other characteristics of the beverage. The transfer heads 1, 2 can engage with a corresponding container 10, 20 in any suitable way, which may depend on how the closure 15, 25 of the container 10, 20 is arranged. For example, in some embodiments, the transfer heads 1, 2 (one or both) can include at least one needle that is configured to pass through the closure 15, 25 of the container 10, 20 so that the distal end of the needle is positioned within an interior space of the container 10, 20 and so the needle forms a seal with the closure 15, 25 such that fluid (gas and/or liquid) cannot enter or exit with respect to the interior space of the container 10, 20 except through one or more lumens of the needle. Where the closure 15, 25 is a wine cork or septum, for example, the at least one needle can be of relatively narrow gauge (e.g., 16 to 22 gauge) such that the needle can penetrate through the cork or septum and maintain a seal with the cork. The needle can be arranged so that when the needle is withdrawn, the cork or septum reseals to prevent passage of fluid into or out of the container. Where the closure 15, 25 is a stopper with a passageway through the stopper, the needle can be suitably sized to pass through the passageway and form a seal with the stopper, e.g., if the stopper passageway has a 0.25 inch diameter opening, the needle can include a tubular element with about a 0.25 inch diameter to pass through and form a suitable seal with the passageway. In some embodiments, the closure 15, 25 may be removed to allow the transfer head 1, 2 to sealingly engage with the opening of the container 10, 20. For example, if the closure is a metal cap, the cap may be removed and then the transfer head 1, 2 engaged with the opening. The transfer head 1, 2 can engage with a container opening in any suitable way, such as by fitting a plug or stopper element of the transfer head 1, 2 into the opening, threadedly engaging the transfer head 1, 2 to the container neck, clamping the transfer head 1, 2 onto the container neck so that a seal is formed between the opening and transfer head 1, 2, and so on. In some cases, a closure of the container 10, 20 (such as a metal cap) can be removed and replaced with another closure 15, 25, such as a cork, stopper, cap or other that is configured to seal the opening of the container 10, 20 closed and permit sealing engagement of the transfer head 1, 2. In some embodiments, the replacement closure 15, 25 can include one or more quick connect fittings to allow a transfer head 1, 2 to be fluidly coupled to one or more needles or other conduits of the replacement closure 15, 25 that are in communication with the interior of the container 10, 20. For example, a closure 15, 25 of a container 10, 20 can be removed and a replacement closure 10, 20 engaged with the container 10, 20 to close the opening to the interior space of the container 10, 20. The replacement closure 15, 25 can include one or more conduits in fluid communication with the interior space of the container 10, 20 and one or more quick connect or other fittings of the replacement closure 15, 25 can removably engage with a transfer head 1, 2 to allow fluid pathways of the transfer head 1, 2 to communicate with the interior space of the container 10, 20. In some embodiments, the transfer head 1, 2 can physically engage with the replacement closure 15, 25, e.g., so the replacement closure 15, 25 physically supports the transfer head 1, 2 on the container 10, 20. Any air or other environmental materials introduced into the container 10, 20 by removal of a closure (e.g., for engagement of a replacement closure 15, 25) can be purged or sparged by introducing inert or otherwise suitable gas into the container 10, 20, as discussed more below.

FIG. 1 shows an embodiment in which the transfer heads 1, 2 each include at least one needle that is configured to pass through the closure 15, 25 of the respective container 10, 20. In some embodiments, the first transfer head 1 includes a first needle 11 and a second needle 12 that each have at least one lumen and pass through the closure 15 so that the distal end of the needle is located in the interior space of the first container 10. In some cases, the first needle 11 can be employed to conduct flow of beverage from the first container 10, and the second needle 12 can be employed to introduce pressurized gas into the first container 10. For example, the first needle 11 can be configured to extend into the container 10 so that a distal end of the first needle 11 is positioned at or near a bottom of the first container 10. Such a configuration can allow the first needle 11 to empty or substantially empty the first container 10 of beverage when the container 10 is upright or in a vertical orientation as shown in FIG. 1. In some cases, the first needle 11 or other needles or conduits of the system can be adjustable in length, e.g., telescoping or otherwise adjustable so as to extend a desired distance into a container. Such an arrangement can, for example, allow a needle or other conduit to be positioned in a desired way in a container, e.g., so a distal end of the needle or conduit is near a bottom of the container or so a distal end of the needle or conduit is near a top or within a gas space of the container. The second needle 11 can introduce pressurized gas into the first container 10 such that beverage is forced to flow into and through the first needle 11 and out of the first container 10. In some embodiments, the transfer head 1 can include a single needle with two lumens rather than the first and second needles 11, 12, and of course, as mentioned above the needles could be eliminated entirely (e.g., if the closure 15 is removed and the first transfer head 1 sealingly engages with the opening of the container 10 using a stopper element or other seal that is part of the transfer head 1). In embodiments where a first needle 11 or other conduit used to conduct flow of beverage from the first container 10 is not positioned at or near a bottom of the container 10 (or the transfer head 1 includes no needle or other conduit that extends from the transfer head 1), the container 10 can be tilted, inverted or otherwise positioned so that beverage can reach an inlet of the first needle 11 or other flowpath of the transfer head 1. Similar is true for the second transfer head 2 which can include first, second and third needles 21, 22, 23 that pass through the closure 25 of the second container 20 as shown. The three needles 21-23 can be combined into one needle, e.g., having one to three lumens, or the needles can be eliminated entirely, e.g., to permit the transfer head 2 to engage with a replacement closure 15, 25 or in other embodiments not requiring a needle.

Regardless of how the first and second transfer heads 1, 2 are engaged and/or fluidly coupled with a respective container 10, 20, the transfer heads 1, 2 can be configured to transfer fluid (gas and/or liquid) with respect to the container 10, 20 (e.g., into and/or out of the container). In FIG. 1, the first transfer head 1 is configured to deliver pressurized gas into the interior space of the first container 10 via the second needle 12 and receive beverage from the first container 10 via the first needle 11. Specifically, the first transfer head 1 has a gas inlet that is fluidly coupled to a pressurized gas source 3 via a gas source line 31. The pressurized gas source 3 can be configured to provide any suitable gas (e.g., argon, carbon dioxide, nitrogen, etc.) under any suitable pressure (e.g., 10 to 3000 psi) to the gas inlet of the first transfer head 1. In some embodiments, the gas source 3 can engage directly with the first transfer head 1, e.g., by engaging a threaded neck of a pressurized gas cylinder with a threaded hole on the first transfer head 1. In some embodiments, the gas source 3 can be remote from the transfer head 1 and fluidly coupled to the first transfer head 1 by a flexible hose or other line or conduit. Although not shown, one or more regulators, flow restrictors and/or other components can be provided with the gas source, transfer head and/or elsewhere to suitably regulate or otherwise control the pressure of gas provided to the first transfer head 1 and/or the containers 10, 20. In some embodiments, a first regulator may be provided for the gas source 3, e.g., so that pressurized gas at a relatively higher pressure can be provided to the gas source line 31. Each transfer head 1, 2 may have its own second regulator to adjust the gas pressure of gas provided via the first regulator and gas source line 31 to a suitable level for use with a respective container 10, 20. For example, a first regulator may be arranged to provide gas at a relatively high pressure of 50 to 100 psi to the transfer heads 1, 2 via the gas source line 31. A second regulator at each transfer head 1, 2 can adjust the gas pressure for a particular application or use condition. For example, a transfer head 1 regulator can adjust gas pressure and flow rate to a level suitable for pressurizing a source container 10 to drive flow from the container 10 to one or more destination containers 20 (e.g., employing a pressure of 5 to 30 psi). A transfer head 2 regulator can adjust a gas pressure and flow rate to a level suitable for purging a destination container 20 of air or other gas prior to dispensing beverage into the container 20 (e.g., using a pressure of 30 psi or higher) and/or to a level suitable to maintain carbonation of a sparkling beverage in the container 20 (e.g., using a pressure of 10-30 psi). Pressures and/or flow rates used by the transfer heads 1, 2 can be different and/or actively controlled during use as needed. For example, pressures and flow rates used for purging may be different than that used for driving beverage flow and/or than that used for maintaining carbonation in a sparkling beverage. Also, pressures and/or flow rates can be adjusted during purging and/or beverage transfer as desired. For example, a higher (or lower) pressure may be initially employed during beverage transfer, followed by a lower (or higher) pressure once beverage transfer begins.

The first transfer head 1 can have first and second gas pathways 4, 5 that are fluidly coupled to the gas inlet of the first transfer head 1 and thus fluidly coupled to the gas source 3 to receive pressurized gas. The first gas pathway 4 can be fluidly coupled to introduce pressurized gas into the interior space of the first container 10, e.g., the first gas pathway 4 can include the second needle 12 and introduce pressurized gas into the first container 10 via the second needle 12. Thus, the first gas pathway 4 can include a first gas outlet (e.g., at the distal end of the second needle 12) to deliver gas to the first container 10. The first gas pathway 4 can include a first gas valve 41 (and/or other components such as a regulator, pressure sensor, etc.) to control gas flow along the pathway 4. The first gas valve 41 can be operable by a user, e.g., manually using a lever or button, to open and close, thereby allowing the user to controllably introduce pressurized gas into the first container 10. In some embodiments, the valve 41 can be controlled by a controller, such as a programmed data processor or other control circuitry. For example, the valve 41 can include an electrically operated solenoid valve that can be controlled to open and close based on suitable electronic signals, e.g., in response to a sensed pressure in the container 10. The controller can adjust a gas pressure and/or flow rate of gas provided to the first container 10 as suitable. Pressurized gas introduced into the first container 10 can raise the pressure inside of the first container 10 to a desired level, e.g., 5 to 50 psi or other pressure suitable to drive flow of beverage from the first container 10, and the pressure can be adjusted during beverage transfer as desired. In some embodiments, the first gas valve 41 can be controlled based on the pressure in the source container 10, e.g., the valve 41 can be turned off automatically when the pressure in the container 10 reaches a particular level. This can help prevent overpressurization of the container 10. The second gas pathway 5 can be fluidly coupled to the second transfer head 2 to introduce pressurized gas into the interior space of the second container 20. For example, the second gas pathway 5 can include a second gas outlet of the first transfer head 1 that is coupled to a gas line which connects to a gas inlet of the second transfer head 2 that is fluidly coupled to the second needle 22 (e.g., which defines a gas outlet of the second transfer head 2).

The second gas pathway 5 can include a second gas valve 51 (and/or other components such as a regulator, pressure sensor, etc.) to control gas flow along the pathway 5. The second gas valve 51 can be operable by a user, e.g., manually using a lever or button and/or by a controller, to open and close, thereby allowing the user to controllably introduce pressurized gas into the second container 20. In some embodiments, pressure in the second container 20 can be vented, e.g., using a vent 24 of the second transfer head 2. The vent 24 can be fluidly coupled to the third needle 23 and thus be capable of venting fluid from the second container 20. In some embodiments, the second gas valve 51 can be selectively opened to introduce pressurized gas into the second container 20 to purge air or other gas from the second container 20. For example, prior to transferring beverage to the second container 20, it may be desirable to purge the container 20 of any air or other potentially contaminating gas. The second gas valve 51 can be opened to deliver pressurized gas into the second container, and as described above, the pressurized gas may be suitably inert, non-reactive or non-damaging to the beverage. As pressurized gas is introduced into the second container, the vent 24 can vent any gas pressure from the container 20, thereby releasing unwanted air or other gas from the container 20. Venting can be achieved by employing any of a variety of pressure-relief valves, either set to vent at a specific pressure or with a variable setting which can be adjusted by the user and/or controlled by a controller, check valves, one way valves, electronically controlled valves, etc. Alternatively, venting could be accomplished using a flow restrictor, again either tunable or set to a fixed flow resistance. Such a restrictor could simply be a small hole or elongated path exiting the transfer head 2. Such a hole or path could employ a semi-permeable membrane that restricts the flow of liquid, but allows the flow of gas. Thus, the vent 24 can include a one-way valve, check valve or other structure suitable to prevent air or other materials from entering the second container 20 through the vent 24. In some cases, the second gas valve 51 can be operated by a timer (e.g., a mechanical or electronically-controlled actuator or controller) so that the valve 51 is opened for a defined period of time so that the second container 20 is purged by pressurized gas during the timer period. Thereafter, the second gas valve 51 can be closed and the second container 20 ready to receive beverage. In some embodiments, a pressure and/or flow rate of gas provided to the second container 20 can be adjusted or otherwise controlled as suitable, e.g., by a controller and associated regulator. For example, in some cases, the container 20 can be pressurized above ambient pressure to receive beverage, e.g., where the beverage is carbonated. The second gas valve 51 can be controlled to maintain a desired pressure in the container 20, e.g., in response to a sensed pressure in the container 20.

A beverage pathway 6 can be provided between the first and second transfer heads 1, 2 so that beverage can be transferred from the first container 10 to the second container 20. Initially, the first or source container 10 can be completely filled or partially filled with beverage, and the second or destination container 20 can be completely empty of any liquid or have some liquid within. In some embodiments, the beverage pathway 6 can include a first beverage pathway of the first transfer head 1 that is fluidly coupled to a second beverage pathway of the second transfer head 2 via a beverage line, e.g., a conduit connected between the transfer heads 1, 2. The beverage pathway can include a beverage valve 61 configured to control delivery of the beverage from the source container 10 to the destination container 20 via the beverage pathway 6. For example, after pressurized gas is delivered to the first container 10 via the first gas pathway 4, the interior space of the first container 10 can be pressurized above ambient pressure and/or above a pressure in the second container 20. The beverage valve 61 can be opened (e.g., manually or automatically by a controller) and beverage can flow through the beverage pathway 6 from the first container 10 to the second container 20. As beverage enters the second container 20 via the first needle 21, pressure in the container 20 can be vented by the vent 24, thereby allowing the second container 20 to the filled with beverage while maintaining a relatively low pressure above ambient in the container 20. In some embodiments, the first needle 21 delivers beverage into the second container 20 at a location that is at or near a bottom or other lowermost part of the interior space of the container 20. For example, the first needle 21 can extend into the container 20 (e.g., the needle 21 can be adjustable in length) so a distal end contacts or is near a bottom of the container 20. As needed, the first container 10 can be repressurized by introducing additional pressurized gas into the first container 10, e.g., by manually or automatically opening the first gas valve 41 when the pressure in the container 10 drops below a particular level, which can be done with the beverage valve 61 open or closed. When the second container 20 is suitably filled with beverage, the beverage valve 61 can be closed and the transfer head 2 disengaged from the second container 20. In some cases, pressurized gas can be introduced into the second container 20 during beverage transfer and/or when beverage transfer is complete, e.g., to maintain carbonation of a sparkling beverage in the container 20 and/or to establish a suitable pressure gradient between the containers 10, 20.

Although FIG. 1 shows only one second container 20 that receives beverage from the first container 10, in some embodiments, multiple second containers 20 can be fluidly coupled to one or more first containers 10. This can permit multiple second containers 20 to be simultaneously and/or serially provided with beverage from one or more first containers 10. In some cases, each of multiple second containers 20 can be coupled to a respective transfer head 2 which is fluidly coupled to a transfer head 1 associated with a first container 10. Such an arrangement can allow multiple second containers 20 to be simultaneously (or serially) filled with beverage from the first container 10. In some cases, multiple second containers 20 can be coupled to multiple first containers 10, e.g., to allow beverage from multiple first containers 10 to be mixed together in each second container 20. In some cases, multiple second containers 20 can be serially coupled with a single transfer head 2, e.g., so that one second container 20 can be filled with beverage from the first container 10, followed by another second container 20, followed by another, etc. The single transfer head 2 can sequentially couple with each second container 20 (e.g., by inserting needles through a closure 25 of the container 20). In some cases, the second containers 20 can be provided automatically (e.g., by robotic or other automated system) to a transfer head 2 for coupling to the transfer head 2. In some embodiments, a transfer head 2 can move as needed to couple with second containers 20 that are stationary and/or moving. For example, second containers 20 can be provided on a rotary turntable, conveyor or other carrier and one or more transfer heads 2 can couple with containers 20. The containers 20 can be moved, e.g., indexed, relative to one or more transfer heads 2 for coupling with the transfer heads 2 and/or transfer heads 2 can move as suitable to couple with containers 20.

Figure 2:
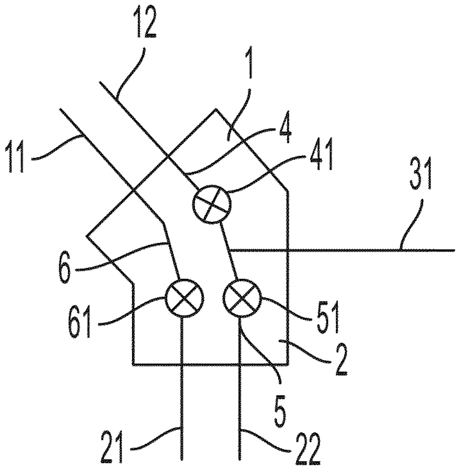
FIG. 2 shows a schematic view of a beverage transfer system in which first and second transfer heads are connected together.

In FIG. 1, the first and second transfer heads 1, 2 are connected by gas and beverage lines which can provide a flexible or rigid connection between the heads 1, 2. A flexible or other connection that permits movement of one transfer head relative to the other may provide advantages, such as allowing one of the containers, such as the source container 10, to be tilted, inverted or otherwise manipulated while the container 10 is engaged with a transfer head 1 so that beverage can enter the first needle 11 or other port to the beverage pathway 6 while allowing the destination container 20 to remain upright. However, a rigid connection between the transfer heads 1, 2 can provide advantages as well. For example, FIG. 2 shows an embodiment in which the first and second transfer heads 1, 2 are fixed together, e.g., made as a single assembly. (The vent 24 is not shown in FIG. 2 but can be provided for the second transfer head 2 as in FIG. 1.) This arrangement can provide for convenient use of the system, particularly when using smaller containers 10, 20. For example, a destination container 20 could first be engaged with the second transfer head 2 and then a source container 10 engaged with the first transfer head 1, e.g., by penetrating a cork or septum at the openings of the source and destination containers 10, 20 with needles of the transfer heads 1, 2. The destination container 20 can be purged of air as needed by operating the second gas valve 51. The source container 10, transfer head assembly and destination container 20 can then be manipulated as a unit so the opening of the source container 10 is positioned at a same level as or below a bottom of the container 10, e.g., so beverage flows toward the first transfer head 1. This configuration can permit the use of shorter needles 11, 12 for the transfer head 1, if needles are used at all, or the elimination of needles entirely because beverage can flow by gravity to a port on the body of the first transfer head 1 that communicates with the beverage pathway 6. The first gas valve 4 can be operated to pressurize the source container 10 and the beverage valve 61 opened to allow transfer of beverage to the destination container 20 via the beverage pathway 6. Pressure in the source container 10 as well as gravity can drive the flow of beverage to the destination container 20, which can occur while the first gas valve 41 is closed or open. When the destination container 20 is suitably filled with beverage, the source container 10 can be tilted to move beverage away from the first needle 11 or other beverage port of the first transfer head 1 and/or the beverage valve 6 can be closed to stop beverage flow. The transfer heads 1, 2 can then be suitably disengaged from the containers 10, 20.

Figure 3:
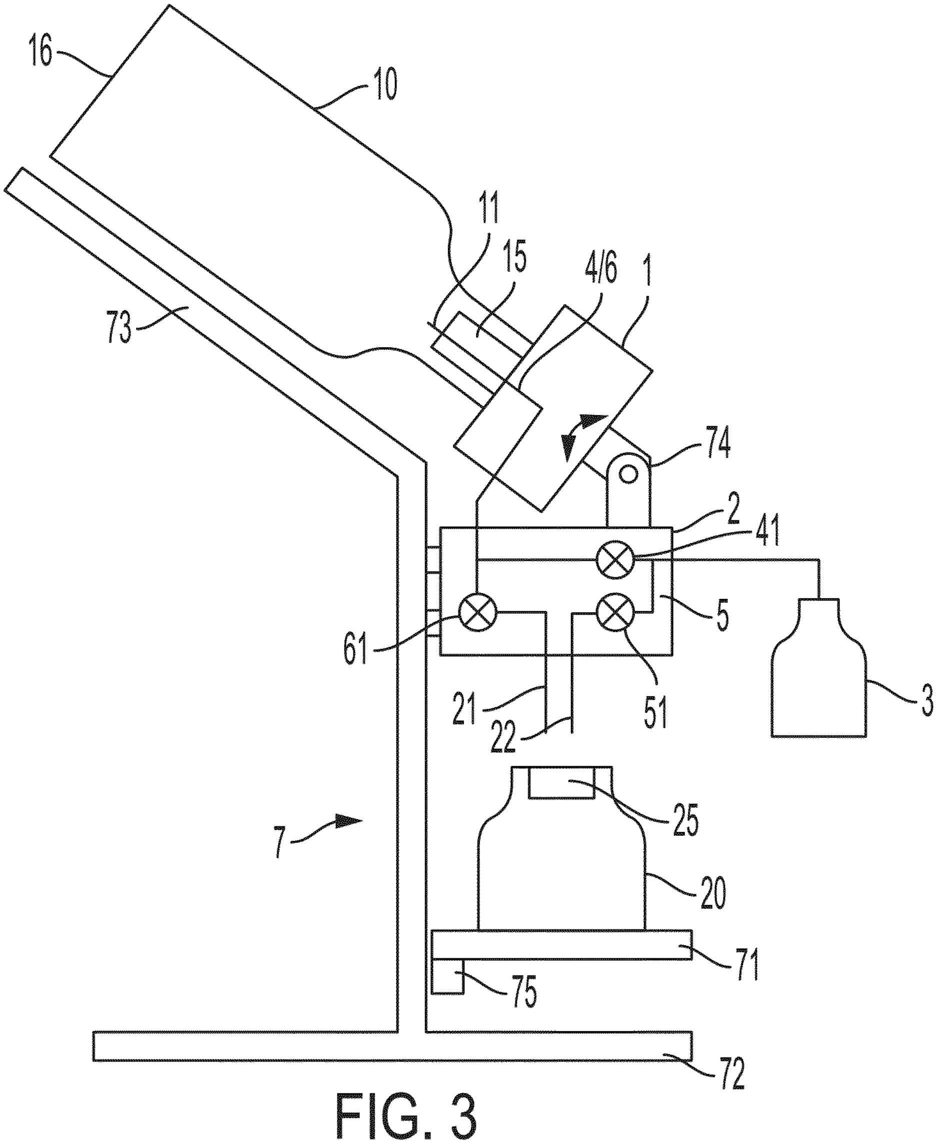
FIG. 3 shows a schematic view of a beverage transfer system including a support for transfer heads and source and destination containers.

FIG. 3 shows an embodiment in which first and second transfer heads 1, 2 are mounted on a support 7 that is also configured to support the source and destination containers 10, 20. The support 7 can have a base 72, e.g., to allow the support 7 to be placed on a table top or other surface. In some embodiments, the support 7 can hold the source container 10 such that the opening and any closure 15 at the opening is located below a bottom 16 of the container 10. This orientation of the container 10 can help move beverage toward the opening and thus to the first transfer head 1 so that beverage can flow into the beverage pathway 6. In FIG. 3, the support 7 is shown having a cradle 73 configured to hold the source container 10 in an inclined position, e.g., so that a longitudinal axis of the container 10 that extends through a center of the opening (or closure 15) and a center of the bottom 16 is arranged at an angle to the horizontal. In some embodiments, the container 10 can be supported in a vertical orientation so that the longitudinal axis is aligned with the vertical and the opening (and any closure 15) is below the bottom 16. The cradle 73 can be configured in any suitable way, such as including one or more Y- or U-shaped elements to hold the container 10, a clamp to engage the container 10, straps, a sleeve, etc. to support the container 10 and so on. In some embodiments, the cradle 73 or other container engagement feature can be attached to the first transfer head 1 rather than the support 7, e.g., a clamp or sleeve on the transfer head 1 can engage with the neck of the container 10 to hold the container 10 as desired. Supporting the source container 10 with the opening positioned below the bottom 16 can avoid the need to employ a needle or a needle having a length that reaches into the interior space of the container 10 because beverage will flow by gravity to the opening. Thus, if a needle 11 is employed, the distal end of the needle 11 need only extend a relatively short distance beyond a bottom or inner side of the closure 15. In some embodiments, the cradle 73 or other container engagement feature can help align the container 10 with the first transfer head 1 for engagement of the container 10 and transfer head 1. For example, a container 10 can be placed on the cradle 73 and then slid along the cradle 73 so that the container 10 sealingly engages with the first transfer head 1, e.g., so that the needle 11 passes through the closure 15.

In some embodiments, the first and/or second transfer head 1, 2 can be mounted for movement relative to the support 7 and/or each other. For example, FIG. 3 shows the first transfer head 1 is mounted by a pivot 74 to the second transfer head 2 and the support 7. That is, the second transfer head 2 is fixed to the support 7, and thus the first transfer head 1 is mounted for movement relative to both the support 7 and the second transfer head 2. However, the pivot 74 could be mounted directly to the support 7 rather than the second transfer head 2, which could itself be separately mounted to the support 7 for movement relative to the support 7. In some embodiments, the first transfer head 1 can be mounted for pivotal movement about a horizontal axis as in FIG. 3, and/or about other axes as desired. Permitting the first transfer head 1 to move about a horizontal axis relative to the support 7 can help enable use with differently sized and/or shaped source containers 10. For example, movement of the first transfer head 1 about a horizontal axis can allow the first transfer head 1 to sealingly engage with source containers 10 that have different diameters and/or lengths than that shown in FIG. 3. That is, for a smaller/larger diameter or shorter/longer container 10 than that shown in FIG. 3, the first transfer head 1 can pivot as needed to allow the container 10 engage the cradle 73 while maintaining engagement of the transfer head 1 with the container opening. The first transfer head 1 can be configured to move translationally relative to the support 7 in addition to pivotally, e.g., the pivot axis of the pivot 74 could be configured to move in a vertical plane as well as allow pivoting of the transfer head 1 about a horizontal axis. Mounting the first transfer head 1 for movement relative to the support 7 can also allow for easier and/or different ways to engage a source container 10 with the first transfer head 1. For example, in the embodiment of FIG. 3, the first transfer head 1 could be pivoted in a clockwise direction so that the container engagement side of the transfer head 1 (e.g., the side from which the first needle 11 extends) faces upwardly and/or to the right in FIG. 3. This could allow the source container 10 to be lowered onto the first transfer head 1, e.g., so that an upwardly facing first needle 11 can be extended into the closure 15 of the container 10 as the container 10 is lowered onto the first transfer head 1. As another example, with the container engagement side of the transfer head 1 facing to the right in FIG. 3, a user could push a source container 10 horizontally (or in a nearly horizontal direction) into engagement with the first transfer head 1. After engagement of the container 10 and transfer head 1, the container 10 and transfer head 1 could be pivoted in a counterclockwise direction as seen in FIG. 3 so that the container 10 is received and supported by the cradle 73 or other container engagement feature.

In some embodiments, the beverage transfer system can include features to automatically engage a source or destination container 10, 20 with a respective transfer head 1, 2. For example, FIG. 3 shows a destination container platform 71 that can be moved relative to the support 7 by a platform drive 75, e.g., in up and down vertical directions as viewed in FIG. 3. Thus, the destination container 20 can be placed on the platform 71 and moved upwardly by the platform drive 75 so that the destination container 20 sealingly engages with the second transfer head 2, e.g., so the first and second needles 21, 22 are inserted through the closure 25. Although in FIG. 3 the container 20 is supported on a flat platform 71, the container 20 can be engaged in any suitable way, such as by a clamp, strap, sleeve, etc. so that the container 20 can be forced into and/or out of engagement with the second transfer head 2. For example, the container 20 can be secured to the platform 71 or other support element so that the container 20 can be pulled downwardly out of engagement with the second transfer head 2. A similar configuration could be used for the source container 10, e.g., the container 10 can be secured to a portion of the cradle 73 which can be moved toward and away from the first transfer head 1 so the container 10 is engaged and disengaged with the first transfer head 1. A drive used to move a container 10, 20 can be configured in any suitable way, such as including a lead screw and motor drive, rack and pinion drive, linkage, hydraulic or pneumatic actuator, a hand-operated lever drive, etc. Also, the containers 10, 20 could be held stationary relative to the support 7 and the first and/or second transfer head 1, 2 moved into and out of engagement with the container 10, 20. For example, the destination container 20 can be clamped or otherwise secured to the platform 71, which may remain stationary. The second transfer head 2 can be moveable downward to engage the needle(s) 21, 22 with the container 20, e.g., while the first transfer head 1 and the source container 10 remain stationary along with the destination container 20. After transfer of beverage, the second transfer head 2 can be moved upwardly to withdraw the needle(s) 21, 22 from the closure 25 or otherwise disengage the second transfer head 2 from the destination container 20.

Although FIG. 3 shows an arrangement including only one source container 10 and one destination container 20, in some embodiments one or more source containers 10 and/or one or more destination containers 20 can be used. For example, multiple transfer heads 2 can be provided that are fluidly coupled to one or more transfer heads 1. Each of the multiple transfer heads 2 can be coupled with a respective destination container 20 for purging, providing beverage to the container 20, etc. The multiple containers 20 can be engaged and/or disengaged with a respective transfer head 2 in an automated way, e.g., by mounting multiple containers 20 onto a platform 71 (or platforms 71) which moves the containers 20 into engagement with a respective transfer head 2. Alternately, the transfer heads 2 can be made movable to engage with multiple stationary containers 20. Similar is true for source containers 10 and transfer heads 1.

The embodiment of FIG. 3 also includes certain modifications that were described above. For example, the first and second gas valves 41, 51 are mounted to the second transfer head 2 rather than the first transfer head 1. Also, the first gas pathway 4 and the beverage pathway 6 are merged into a single conduit in at least a portion associated with the first transfer head 1, e.g., in a lumen of the first needle 11 and a conduit attached to the first transfer head 1. Thus, pressurized gas can be introduced into the source container 10 via the first needle 11, and beverage can be transferred out of the source container 10 via the first needle 11. As noted above, pressure in the source container 10 (as well as gravity) can drive flow along the beverage pathway 6, and so the source container 10 can first be pressurized by introducing pressurized gas via the first gas pathway 4, e.g., by opening the first gas (or pressurize) valve 41, and then beverage transferred to the destination container 20 by opening the beverage valve 61. The second transfer head 2 does not include a vent in this embodiment, although one could be provided. To vent the destination container 20, e.g., during a purge or sparge operation in which the second gas (or sparge) valve 51 is opened, the beverage valve 61 could be configured as a three-way valve such that the beverage valve 61 has beverage transfer and vent positions. In the vent position, the beverage valve 61 can permit venting of gas from the destination container 20 as pressurized gas is introduced via the second gas pathway 5. In the beverage transfer position, the valve 61 can allow transfer of beverage along the beverage pathway 6. Similarly, to vent the destination container 20 during beverage transfer, the second gas valve 51 can be configured as a three-way valve that has gas flow and vent positions. In the vent position, the second gas valve 51 can allow gas to exit the destination container 20 as beverage flows into the container 20 via the beverage pathway 6. In the gas flow position, the valve 51 can allow pressurized gas flow into the destination container 20. Determining that a destination container 20 is suitably filled with beverage can be done in different ways, such as by a user observing the container 20 and closing the beverage valve 61 at a suitable time. In some embodiments, conductivity between two or more needles 21-22 can be used to detect arrival of beverage at or near a top of the container 20. For example, a first needle 21 used to deliver beverage into the container 20 can have a distal end positioned at or near a bottom of the container, and thus be in contact with beverage throughout most of the fill operation. Another needle, such as a vent needle 23, may have a distal end positioned well above the bottom of the container 20, e.g., near a lower side of the closure 25. Thus, when conductivity between the needles 21, 23 is detected, a determination may be made that beverage is in contact with the vent needle 23 and thus has reached a level near the closure 25.

Destination containers 20 that contain beverage from a source container 10 can be associated with the source container 10 in various ways, such as by using a computer database and suitable identifiers on the containers 10, 20. For example, source and destination containers 10, 20 can have indicia such as a machine readable code (e.g., optically, magnetically, and/or electromagnetically readable such as the case with barcodes, RFID tags, etc.) that can be read from the containers 10, 20 to obtain a unique identity of the container 10, 20 as well as optionally obtain information about their contents. The identity and association of source and destination containers 10, 20 can be stored in a database, e.g., so that destination containers 20 that hold beverage from a particular source container 10 can be identified and tracked. For example, records can be created for each source container 10 (or each destination container 20) and information regarding associated destination containers 20 (or a source container 10) that contain beverage from the source container 10 stored in a record for the source container 10. Other relevant information can be stored as well, including the beverage type or other characteristics, the date on which and/or location where the beverage transfer was made, the current location or owner of the destination container(s) 20, an identifier of the system used to transfer the beverage from source to destination container, and so on. To form a record, an RFID tag, barcode, a bottle label or other indicia can be read from a source container 10, e.g., to determine a unique identity for the source container 10 and/or other information about the beverage, such as type, vineyard, year bottled, etc. if such information is stored in the machine readable code. If a source container 10 does not have indicia that can uniquely identify the container 10 (e.g., UPC labels generally cannot uniquely identify a particular bottle from other bottles having the same beverage), a label including unique indicia can be applied to the container 10 and then read and used to form a suitable record. As needed, information regarding the beverage in the source container 10 can be obtained by scanning a label or other portion of the source container 10 and accessing a database or other information source. For example, a bottle label can be scanned to identify a vineyard, wine type and year, and information regarding the wine can be retrieved from a database. Indicia on destination containers 20 can also be read, and the unique identifiers for the source container 10 and associated destination containers 20 stored in one or more records along with other information regarding the beverage and/or beverage transfer for later retrieval. This can allow a user of a destination container 20 to easily identify which source container 10 the beverage in the container 20 came from, as well as other information such as the type of beverage or other characteristics, when the sample was taken, and so on.

Figure 4:
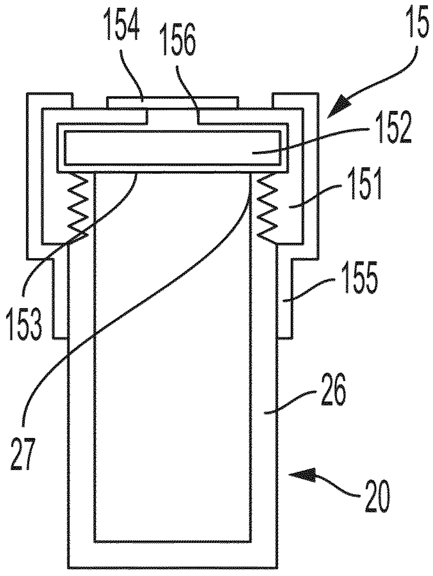
FIG. 4 shows a destination container with a closure engaged with the container body to seal the interior space closed and ready for sparging or transfer of beverage to the container.

As noted above, a destination container 20 can be configured in various ways and FIG. 4 shows one embodiment. The container 20 of FIG. 4 includes a container body having an interior space to hold liquid beverage and an opening 27 through which to access the interior space. The container 20 also has a closure 15 which in some embodiments can include a cap 151 engaged with the container body to seal the opening 27 closed to prevent gas or liquid from passing through the opening 27. The cap can include a portion, such as a septum 152, configured to be pierced by a needle to dispense the liquid beverage into the container body 26 and to reseal upon withdrawal of the needle to prevent gas or liquid from passing through the cap 151. For example, the septum 152 can be a block or body of elastomeric material that is held in an inner space defined by the cap 151. The septum 152 can be compressed by the cap 151 in radial and/or axial directions, e.g., the septum 152 may need to be compressed in radial and/or axial directions to be received into the inner space defined by the cap 151. Such compression can help the septum 152 define a seal with the cap 151 and/or help the septum 152 reseal during and after a needle has pierced through the septum 152. The septum 152 can be pressed against the container body 26, e.g., at a portion around the opening 27, to define a seal with the container body 26. In some embodiments, a barrier layer 153 can be provided between the septum 152 and the container body 26, e.g., to help enhance an oxygen barrier and/or barrier to other material such as moisture. In some embodiments, the septum 152 can be formed of an elastomeric material that itself has barrier properties, e.g., provides a barrier to oxygen. In some embodiments, the septum 152 can have a barrier film or layer applied to upper and/or lower surfaces of the septum 152 (e.g., surfaces that face the interior space of the container 20 and that face away from the interior space of the container 20). Such a barrier film or layer can provide a barrier to oxygen, moisture and/or other materials. In some embodiments, the barrier layer 153 can include a PVDC (polyvinylidene dichloride) film or foam layer. The cap 151 can have an upper opening 156 through which a needle can enter the inner space of the cap 151, e.g., to penetrate through the septum 152. A barrier label 154 can be provided over the upper opening 156, e.g., to provide an oxygen or other barrier for the cap 151. In some embodiments, the barrier label 154 can include a metalized film or other material that has suitable barrier properties (e.g., for oxygen, moisture and/or other materials) that is applied over the upper opening 156 after the container 20 is provided with beverage. In some embodiments, the barrier label 156 can extend over the closure 15 and to the container body 26, and can function as a tamper evident feature (e.g., to indicate whether the label 156 has been removed or otherwise disturbed after being placed on the container 20). In some embodiments, a paper label, shrink film or other tamper evident feature can be placed over the label 156 and/or other portions of the closure 15 (e.g., to indicate whether an attempt has been made to remove the closure 15, open the container or otherwise expose the container contents to the external environment).

The cap 151 can have a lower opening and engage with the container body 26, e.g., by a threaded engagement, adhesive, crimping, friction fit, etc. Thus, the cap 151 can have a passageway through the cap that extends from the upper opening to the lower opening. A tamper evident seal 155 can be provided on the cap to indicate the cap has not been removed from the container body 26. For example, the tamper evident seal 155 can include a shrink wrap covering, sticker, label or other arrangement that allows a user to easily identify whether the cap 151 has been removed from the container body 26. In some cases, the tamper evident seal 155 can include a perforated metal band or sleeve which has a lower part secured to the container body 26 and an upper part that defines the cap 151. When the cap 151 is removed, e.g., by unthreading the cap 151 from the body 26, the perforation can break or separate, indicating the cap has been removed from the body 26. By providing an indication regarding whether the cap 151 has been removed, a user can readily determine whether an interior space of the container 20 has been exposed to air or other environmental conditions whether the container 20 contains beverage or not. For example, the destination container 20 may be sparged or purged of air while the cap is secured to the body 26 and so contain only inert or non-reactive gas and no liquid. Thus, the tamper evident seal 155 can indicate that the sparged or purged container 20 remains unopened and ready to receive beverage. Alternately, the container 20 can be at least partially filled with beverage while the cap 151 is secured to the body 26. In this case, the tamper evident seal 155 can indicate whether the beverage has been exposed to air or other environmental conditions by removal of the cap 151. The tamper evident seal 155 can extend over the upper opening 156, e.g., define the barrier label 154 or extend over the barrier label 154 if desired.

To make beverage transfer more convenient for a user, the user can be provided with a destination container 20 that has a pre-sealed interior space, e.g., having a container body 26 and cap 151 that seals the interior space of the body 26, and the pre-sealed interior space can be sparged or purged of air and other materials. Having the interior space sparged before use can make beverage transfer easier, e.g., because a user need not sparge the container 20 prior to transfer and/or because the container 20 can be ensured to be sparged to have particular conditions that a user may not easily be able to replicate. For example, a container 20 can be sparged so the interior space contains only gas and no liquid, contains argon or $CO_2$ gas, includes less than 0.5% oxygen gas, and/or has an internal pressure within 20% of atmospheric pressure (e.g., that is above atmospheric pressure to help prevent entry of ambient air or other exterior environment into the interior space). Since sparging can occur after a cap 151 or other closure 15 is secured to the container body 26, a septum or other piercable element of the closure 15 may have pierced opening that is resealed to prevent gas or liquid from passing through the cap as a result of the sparging operation. Alternately, the containers 20 need not be pre-sparged and may be sparged or purged by a user, e.g., immediately before transferring beverage to the container 20. After sparging or transfer of beverage, a barrier label 154 can be placed on the cap 151 or other closure 15 to help provide a barrier to entry of oxygen or other materials, e.g., through the septum or a resealed opening in the septum.

In some embodiments, the container body 26 can be a rigid structure that defines the interior space of the container body 26 to have a particular fixed volume. For example, the container body 26 can be made of a glass, metal, rigid plastic or other material. In some embodiments, the container body 26 can be collapsible, expandable or otherwise define a variable volume for the internal space. As an example, the container body 26 can be made of a flexible film or other material to form a pouch or other container that has a variable internal volume. In some cases, a container 20 having a collapsible and/or expandable container body 26 can be arranged to have a minimum internal volume before beverage is transferred to the container 20. This can avoid or reduce any need to purge the internal volume of the container 20 prior to transferring beverage to the container 20. Alternately, such a container 20 can be purged (e.g., using an inert or other suitable gas), but the reduced or minimized internal volume of the container 20 during purging can reduce an amount of gas needed for purging. A container 20 having a collapsible or expandable container body 26 can have any suitable type of closure 15, such as those described above. Transfer of beverage to the container 20 can cause the container body 26 to expand so as to increase the internal volume of the container 20 to accommodate the beverage.

Regarding needles that may be used in various embodiments to access the interior space of a container, it has been found that needles having a smooth walled exterior, non-coring pencil point (having an opening at the needle side-wall) or Huber point needle of 15 gauge or higher are effective to penetrate through a wine bottle cork, septum or other closure, while sealing effectively with the cork to prevent the ingress or egress of gases or fluids during beverage transfer and/or after needle removal. Moreover, such needles allow the cork to reseal after withdrawal of the needle, allowing the bottle and any remaining beverage to be stored for months or years without abnormal alteration of the beverage flavor. Further, such needles may be used to penetrate a foil cover or other wrapping commonly found on wine bottles and other bottles. Thus, the needle may penetrate the foil cover or other element as well as the closure, eliminating any need to remove the foil or other wrapping prior to beverage extraction. Other needle profiles and gauges are also usable with the system. A needle can have a non-coring tip that can be passed through a cork or other closure without removing material from the cork. One non-coring tip is a pencil-tip that dilates a passageway through the cork, although deflected-tip and stylet needles have also been found to work properly and could be used. The pencil-tip needle preferably has at least one lumen extending along its length from at least one inlet on the end opposite the pencil-tip and at least one outlet proximal to the pencil-tip. A needle outlet may be positioned in the side-wall of the needle at the distal end of the needle, although proximal of the extreme needle tip. Multiple relatively small holes may be provided in the needle sidewall.

With the correct needle gauge, it has been found that a passageway (if any) that remains following removal of the needle from a cork, septum or other closure self-seals against egress or ingress of fluids and/or gasses under normal storage conditions. Thus, a needle may be inserted through a closure to extract beverage, and then be removed, allowing the closure to reseal such that beverage and gas passage through the closure is prevented. While multiple needle gauges can work, preferred needle gauges range from 16 to 22 gauge, with an optimal needle gauge in some embodiments being between 16 and 20 gauge. These needles gauges may offer optimal fluid flow with minimal pressures inside the bottle while doing an acceptably low level of damage to the cork even after repeated insertions and extractions.

Multiple needle lengths can be adapted to work properly in various embodiments, but it has been found that a minimum needle length of about 1.5 inches (3.8 cm) may be required to pass through standard wine bottle corks. Needles as long as 9 inches or more could be employed, e.g., to extend from an opening of a bottle to the bottom of the bottle. When two or more needles are used, the needle lengths may be the same or different and vary from 0.25 inches to 10 inches (0.64 to 25.4 cm). Creating distance between the inlet/outlets of the needles can prevent cross contamination/flow between the two lumens.

In some embodiments, the length, gauge, opening size and/or other characteristics of a needle can be adjusted to optimize gas and beverage flow without causing froth or foaming of a beverage. Huber point and similar needles have been found to be particularly effective in this regard. In some cases, needles are optimized so as to reduce their length and provide a fastest fluid flow without causing froth or foaming of a beverage such as wine. Needles can be used to penetrate a septum or other closure in different ways, e.g., so that the needle passes through the septum or other closure in a direction perpendicular to an entry plane of the closure, in a direction at a non-perpendicular angle to the entry plane of the closure, and in other ways. In some embodiments, needles having a curved shape can be employed and penetrated through a cork, septum or other closure. Such a curved needle can be penetrated through a closure by pivoting the needle about an axis so that the leading end of the needle penetrates the closure in a direction that is perpendicular to the entry plane of the closure but the needle follows a curved path through the closure. In some embodiments, a curved needle can penetrate a closure so that a distal end or other portion of the needle that has an outlet opening is located adjacent an inner wall of the container. This can allow beverage such as wine to flow into the container and contact the inner wall of the container at a relatively high flow rate without creating froth or foam or otherwise minimizing mixing of the beverage with gas in the container.

In some embodiments, a suitable gas pressure is introduced into a source container to extract beverage. For example, it has been found that a maximum pressure of between around 20 and 100 psi (1.4-6.9 bar) may be introduced into the bottle without risking leakage at, or ejection of, the cork, although other pressures may be used. In some embodiments, the system can include a pressure meter that detects the original pressure within the source container. The pressure meter can act as a guide to the user as to the appropriate pressure to introduce into the source container. Alternatively, an electronic control system can be employed to automatically dispense beverage and pressurize the source container to a suitable pressure for transfer. Any version of a pressure monitoring or control system, either by the user or electronically, could also be used.

The source of pressurized gas can be any of a variety of regulated or unregulated pressurized gas bottles filled with any of a variety of non-reactive gasses. In a preferred embodiment, the gas cylinder contains gas at an initial pressure of about 2000-3000 psi (138-207 bar). This pressure has been found to allow the use of a single relatively small compressed gas cylinder (e.g., about 3 inches [7.6 cm] in length and 0.75 inches [1.9 cm] in diameter) for the transfer of the contents of several bottles of wine. Multiple gasses have been tested successfully over extended storage periods. Preferably the gas used is non-reactive with the beverage within the bottle, such as wine, and can serve to protect the beverage from oxidation or other damage, but any suitable gas that is reactive or non-reactive with beverage can be used. Suitable gases include nitrogen, carbon dioxide, argon, helium, neon and others. Mixtures of gas are also possible. For example, a mixture of argon and another lighter gas could blanket wine or other beverage in argon while the lighter gas could occupy volume within the bottle and perhaps reduce the overall cost of the gas. Pure carbon dioxide has been found as a preferred gas for most sparkling wine beverages.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A system for transferring beverage from a source container to a destination container, comprising:

a first transfer head having a first body including a gas inlet to receive pressurized gas, first and second gas outlets fluidly coupled to the gas inlet, the first gas outlet fluidly coupled to an interior space of a first container when the first body is engaged with the first container to deliver gas to the interior space of the first container, and a first beverage pathway fluidly coupled to the interior space of the first container when the first body is engaged with the first container to transfer beverage with interior space of the first container;

a second transfer head having a second body including a gas inlet, a gas outlet fluidly coupled to the gas inlet and an interior space of a second container when the second body is engaged with the second container, and a second beverage pathway fluidly coupled to the interior space of the second container when the second body is engaged with the second container to transfer beverage with the interior space of the second container;

a gas line fluidly connecting the second gas outlet of the first transfer head to the gas inlet of the second transfer head to deliver gas from the gas inlet of the first transfer head to the gas inlet of the second transfer head; and a beverage line fluidly connecting the first and second beverage pathways to transfer beverage between the interior space of the first container and the interior space of the second container.

2. The system of claim 1, wherein the first gas outlet and the first beverage pathway are connected to at least one needle to deliver gas into the interior space of the first container and transfer beverage with the interior space of the first container.

3. The system of claim 2, wherein the at least one needle includes a first needle connected to the first gas outlet and a second needle connected to the first beverage pathway, the first and second needles configured to penetrate through a closure of the first container to position distal ends of the first and second needles in the interior space of the first container.

4. The system of claim 1, wherein the gas outlet of the second transfer head and the second beverage pathway are connected to at least one needle to deliver gas into the interior space of the second container and transfer beverage with the interior space of the second container.

5. The system of claim 4, wherein the at least one needle includes a first needle connected to the gas outlet of the second transfer head and a second needle connected to the second beverage pathway, the first and second needles configured to penetrate through a closure of the second container to position distal ends of the first and second needles in the interior space of the second container.

6. The system of claim 1, wherein the first and second transfer heads are physically connected to each other and engageable with the first and second container, respectively, with one of the first and second containers positioned above the other of the first and second containers.

7. The system of claim 6, wherein the first and second transfer heads are pivotally connected together.

8. The system of claim 1, wherein the first container is the destination container and the second container is the source container, and the beverage line is connected to the second beverage pathway to deliver beverage from the source container to the destination container via the first beverage pathway.

9. The system of claim 1, further comprising:

a first gas valve to control gas flow from the gas inlet of the first transfer head to the first gas outlet to introduce gas into the first container;

a second gas valve to control gas flow from the gas inlet of the first transfer head to the second gas outlet to introduce gas into the second container via the gas outlet of the second transfer head; and a beverage valve to control flow of beverage through the beverage line.

10. The system of claim 9, wherein the first container is the destination container and the second container is the source container, wherein the first gas valve is controllable to open to deliver gas from the gas inlet to the destination container to replace air in the destination container with gas from the gas inlet, wherein the second gas valve is controllable to open to deliver gas from the gas inlet to the source container to pressurize the source container and cause beverage flow from the source container to the destination container via the first beverage pathway, the beverage line and the second beverage pathway, and wherein the beverage valve is controllable to open to permit beverage flow from the source container to the destination container and to close to stop beverage flow from the source container to the destination container.

11. The system of claim 1, wherein the first transfer head includes structure to sealingly couple the first gas outlet and the first beverage pathway with the interior space of the first container suitable to prevent ambient atmosphere from entering the interior space of the first container; and wherein the second transfer head to includes structure to sealingly couple the gas outlet of the second transfer head and the second beverage pathway with the interior space of the second container suitable to prevent ambient atmosphere from entering the interior space of the second container.

* * * * *